(12) United States Patent
Penugonda et al.

(10) Patent No.: US 11,108,743 B2
(45) Date of Patent: Aug. 31, 2021

(54) INITIALIZATION ENCRYPTION FOR STREAMING CONTENT

(71) Applicant: Combined Conditional Access Development & Support, LLC

(72) Inventors: Madhu Penugonda, San Diego, CA (US); Lawrence Tang, San Diego, CA (US)

(73) Assignee: Combined Conditional Access Development And Support, LLC, Philadelphia, PA (US)

( * ) Notice: Subject to any disclaimer, the term of this patent is extended or adjusted under 35 U.S.C. 154(b) by 110 days.

(21) Appl. No.: 16/446,095

(22) Filed: Jun. 19, 2019

(65) Prior Publication Data

US 2020/0014665 A1 Jan. 9, 2020

Related U.S. Application Data

(63) Continuation of application No. 15/192,097, filed on Jun. 24, 2016, now Pat. No. 10,375,030.

(51) Int. Cl.
*H04L 29/06* (2006.01)

(52) U.S. Cl.
CPC ...... *H04L 63/0428* (2013.01); *H04L 65/4084* (2013.01); *H04L 65/602* (2013.01); *H04L 65/80* (2013.01)

(58) Field of Classification Search
CPC . H04L 63/0428; H04L 65/4084; H04L 65/80; H04L 65/602
See application file for complete search history.

(56) References Cited

U.S. PATENT DOCUMENTS

| | | | |
|---|---|---|---|
| 6,898,285 B1 | 5/2005 | Hutchings et al. | |
| 9,043,827 B1* | 5/2015 | Rapoport | H04N 7/163 725/31 |
| 2003/0190044 A1 | 10/2003 | Higashi et al. | |
| 2005/0044361 A1* | 2/2005 | Chang | H04L 63/123 713/167 |
| 2006/0123246 A1 | 6/2006 | Vantalon et al. | |
| 2007/0033396 A1* | 2/2007 | Zhang | H04L 63/062 713/168 |
| 2007/0124602 A1 | 5/2007 | Wald et al. | |
| 2007/0258583 A1 | 11/2007 | Wajs | |
| 2008/0205643 A1* | 8/2008 | Chen | H04L 63/0428 380/205 |
| 2011/0010562 A1 | 1/2011 | Kill et al. | |
| 2011/0238991 A1 | 9/2011 | Schipper | |
| 2012/0060194 A1 | 3/2012 | Alexander | |
| 2012/0137321 A1 | 5/2012 | Bjordammen | |
| 2012/0216038 A1* | 8/2012 | Chen | H04N 21/44231 713/168 |

(Continued)

*Primary Examiner* — Robert B Leung
(74) *Attorney, Agent, or Firm* — Banner & Witcoff, Ltd.

(57) ABSTRACT

Methods are disclosed for creating a virtual encryption session prior to video streaming content being requested to reduce or eliminate delay in initialization of the encryption session and content delivery to the customer. A virtual session has control word(s) (CW) and virtual entitlement control message(s) (ECM) that are devoid of content specific information. One or more virtual sessions may be stored at an edge device and may be used to encrypt the first portion of a content stream while a content-specific encryption session is being initiated.

20 Claims, 5 Drawing Sheets

(56) References Cited

U.S. PATENT DOCUMENTS

| | | | |
|---|---|---|---|
| 2012/0275597 A1* | 11/2012 | Knox | H04N 21/8586 380/210 |
| 2014/0096271 A1 | 4/2014 | Wang et al. | |
| 2016/0112381 A1* | 4/2016 | Bhattacharyya | H04W 12/02 713/171 |

* cited by examiner

INITIALIZATION ENCRYPTION FOR STREAMING CONTENT

CROSS-REFERENCE TO RELATED APPLICATIONS

This application is a continuation of application Ser. No. 15/192,097, filed Jun. 24, 2016, which is hereby incorporated by reference in its entirety.

BACKGROUND

Video on demand (VOD) service delivery involves the use of multiple real-time flows that originate when a consumer requests a specific video asset. The process flows are coordinated by a backend control system and are supported by a network of video servers, IP network elements and access control elements such as encryptors. Encryption of streaming content helps a content provider protect the content from piracy.

If a request is received from a consumer device for streaming content, the back office alerts a video streaming server to the request. The server then streams the requested content over the network to an edge device that is capable of encrypting the streaming data. The edge device may then initiate an encryption session for the content by requesting a set of control words (CWs) and a set of entitlement control messages (ECMs) from an ECM Generator (ECMG). A CW is a cryptographic key that is used to encrypt the data stream. An ECM is a message that transmits information for calculating the CW along with other digital rights management (DRM) information that is specific to the requested content. Once the edge device receives CWs/ECMs from the ECMG, it will begin to encrypt the requested content with the CWs. The edge device also embeds the ECM(s) into the transport stream and provides the encrypted content along with the embedded ECM(s) to the consumer device over the network. A decryptor within the consumer device will recover the CWs from embedded ECMs and use the CWs to decrypt the content, thereby producing clear, unencrypted content to be displayed for the consumer.

A problem with the current system is that the encryption session with an ECMG is not initiated until the arrival of the requested content stream at the edge device. The packets of the unencrypted video stream that are received at the edge device prior to arrival of the initial CW/ECM must be discarded as dictated by the service provider's policy. This may result in a poor or even unacceptable response time for video playback at the consumer device. These and other problems are addressed herein.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In some aspects of the disclosure, a method is provided to encrypt a portion of content with a set of CWs each associated with a virtual ECM and to transmit that encrypted content to a consumer, then encrypt another portion of the content with a set of CWs each associated with a content-specific ECM and transmit the additional portion of the encrypted content to the consumer. In other aspects, a method is provided to create a virtual encryption session prior to receipt of the clear content at the edge device which is then assigned to a later received clear content stream. In aspects of the disclosure, the edge device may manage multiple virtual encryption sessions to maintain a minimum number of such sessions.

BRIEF DESCRIPTION OF THE DRAWINGS

Some features herein are shown by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
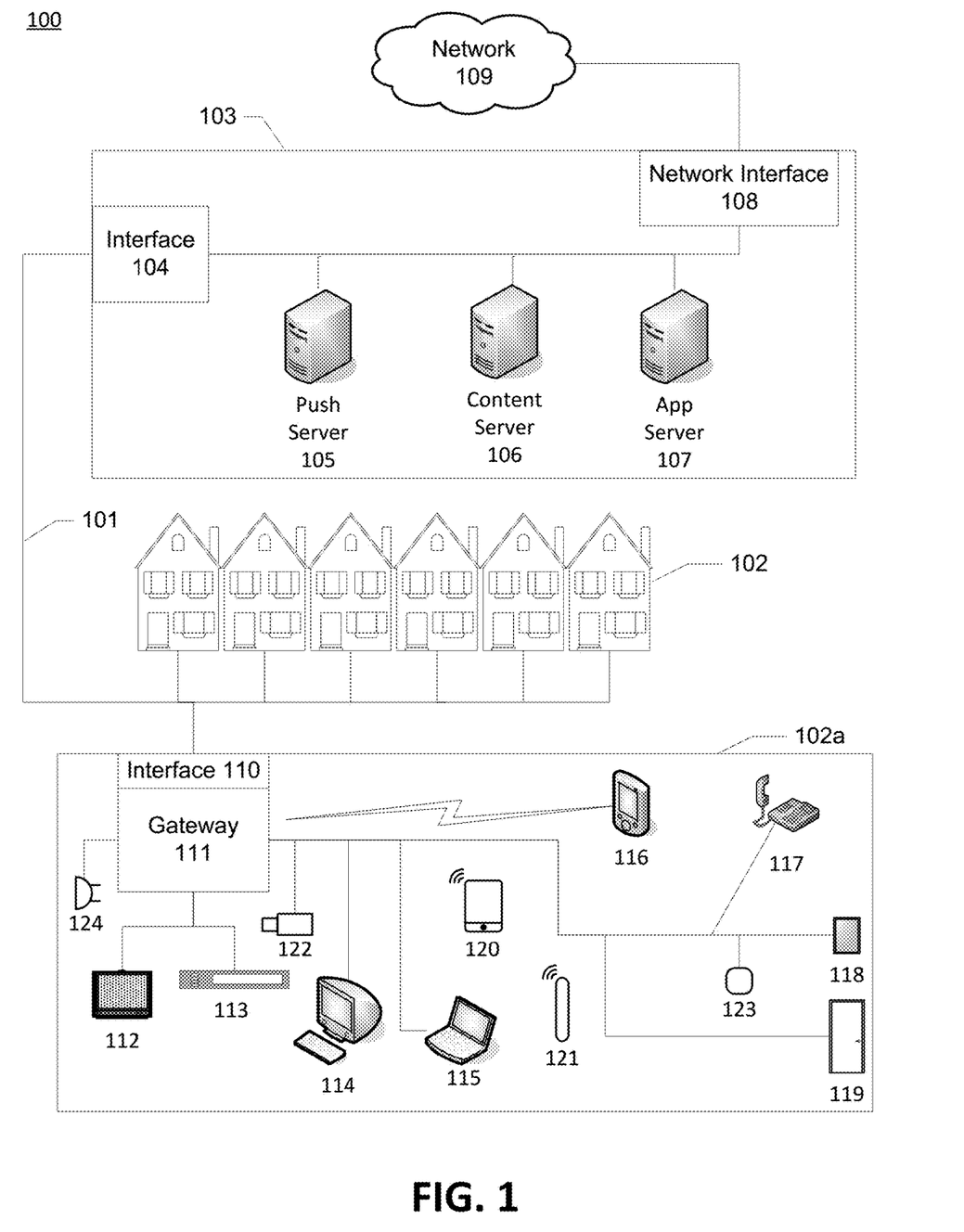
FIG. 1 shows an example information access and distribution network in accordance with one or more aspects as described herein.

FIG. 1 shows an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). The local office 103 may also utilize an edge device (not shown) to transport video services to downstream networks. In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. An application server may be responsible for monitoring user media habits and collecting that information for use in selecting advertisements. An application server may also be responsible for formatting and inserting advertisements in a video stream and/or content item being transmitted to the premises 102. It should be understood by those skilled in the art that the same application server may be responsible for one or more of the above listed responsibilities.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, door home security sensors 119, tablet computers 120, personal activity sensors 121, video cameras 122, motion detectors 123, microphones 124, and/or any other desired computers, sensors, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
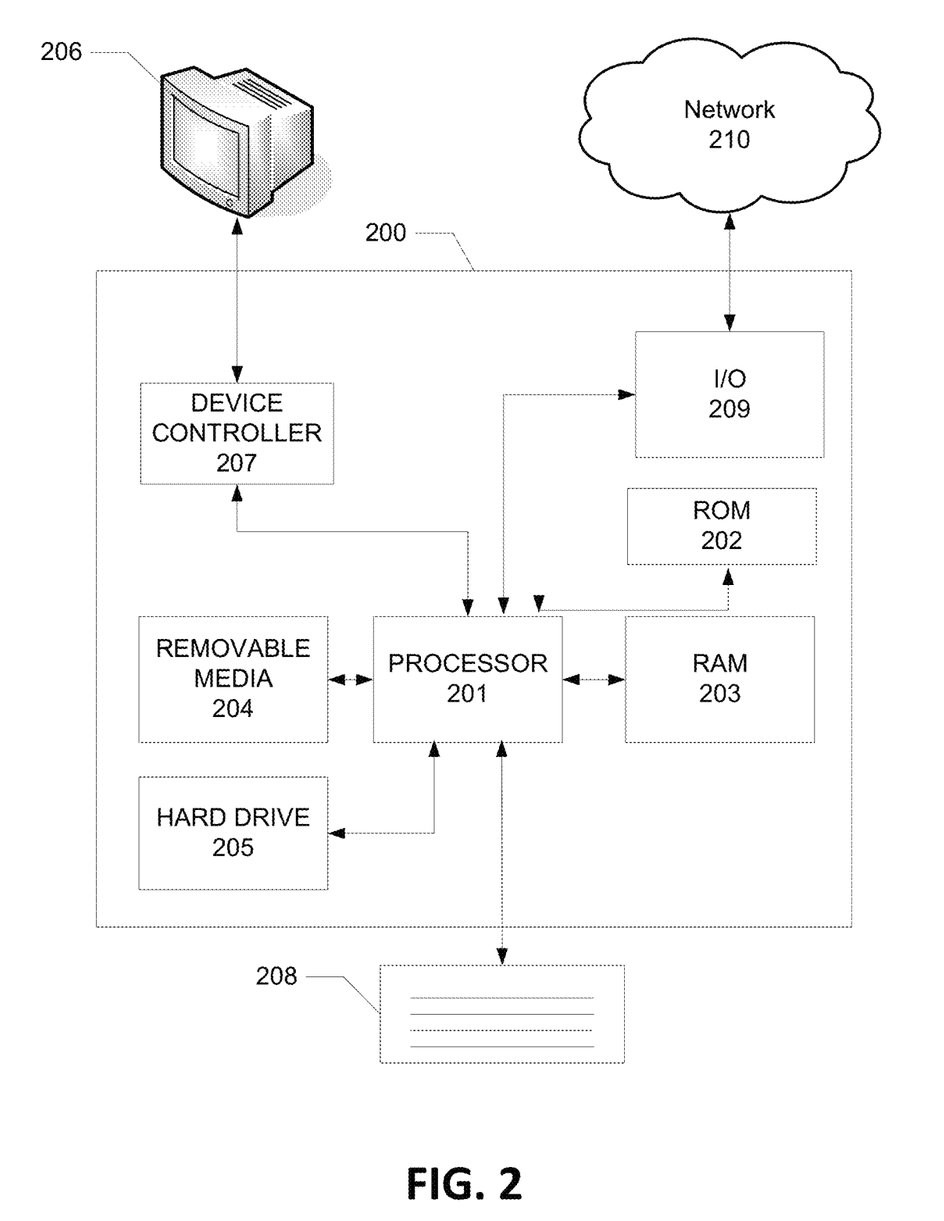
FIG. 2 shows an example computing device that may be used to implement any of the features and devices described herein.

FIG. 2 shows general hardware elements of an example computing device 200 that can be used to implement any of the elements discussed herein and/or shown in the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

FIG. 2 shows an example hardware configuration. Modifications may be made to add, remove, combine, divide, etc. components as desired. Additionally, the components shown may be implemented using basic computing devices and components, and the same components (e.g., processor 201, storage 202, user interface 209, etc.) may be used to implement any of the other computing devices and components described herein. For example, the various components herein may be implemented using computing devices having components such as a processor executing computer-executable instructions stored on a computer-readable medium, as shown in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. on the device or may be accessible over a network such as in a cloud based network environment. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to show one or more aspects described herein, but these are merely illustrative examples.

Figure 3:
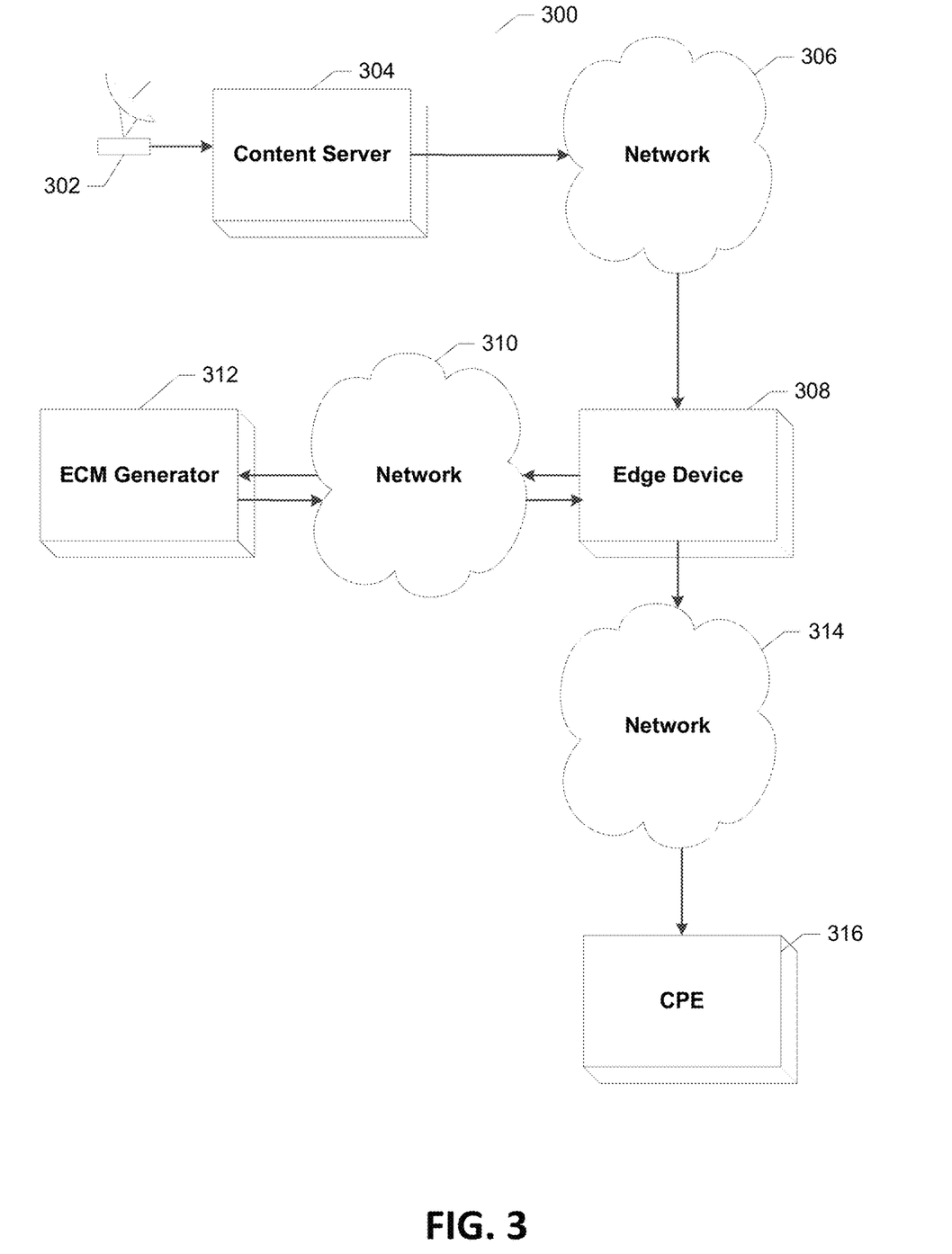
FIG. 3 shows an example network configuration in accordance with one or more aspects as described herein.

FIG. 3 shows an example network configuration 300 in accordance with one or more aspects as described herein. The network configuration 300 of FIG. 3 may represent a portion of the information distribution network 100 of FIG. 1 and/or the network 210 of FIG. 2. One or more of the devices shown in FIG. 3 may be implemented using the example computing device 200 of FIG. 2. In some embodiments, one or more content streams, for example, live programming or video on demand, may be received by the satellite receiver 302. Although a satellite receiver is depicted in FIG. 3, the content streams may be received via various means, such as via an antenna or via a fiber optic cable. The received content streams may be stored in one or more content server(s) 304 prior to streaming the content to customer premises equipment (CPE), such as the CPE 316. The term "customer premises equipment" has been provided for exemplary purposes and is not intended to limit the scope of the disclosure. It would be understood by those skilled in the art that various devices at other locations may implement the methods as disclosed herein.

The content server 304 may comprise any computing device that incorporates the use of at least one processor and at least one memory for storing software or processor executable instructions. The content server 304 may comprise random access memory (RAM), non-volatile memory, and an input/output (I/O) module for communicating with other components or elements of the example network configuration 300. A single content server 304 is depicted in FIG. 3; however, any number of content servers may be used according to the methods disclosed herein.

The content may be stored in the content server 304. The content server 304 may comprise a data storage repository for storing content such as multimedia programs that may be requested by a client device. The content server 304 may comprise magnetic hard disk drives, optical discs such as CDs and DVDs, and/or other optical media or optical drives, NAS devices, and/or any combination thereof. The programs stored in the content server 304 may comprise any type of linear or non-linear program such as a video on demand (VOD) program. The program may comprise video, audio, or any type of multimedia program such as movies, sporting events, or shows, for example.

After a request for content is received at the back office (not shown), the content server 304 may transmit the content streams over a network 306 to one or more edge devices 308, for example, via multicast, for transport to the CPE 316. The edge device 308 may comprise any computing device that incorporates the use of at least one processor and at least one memory for storing software or processor executable instructions. Depending on the type of network, examples of an edge device 308 may be a quadrature amplitude modulation (QAM) modulator, an IP router, or any other device capable of performing the desired encryption discussed herein. The edge device 308 may comprise random access memory (RAM), non-volatile memory, and an input/output (I/O) module for communicating with other components or elements of the example network configuration 300.

Encryption may be incorporated into the edge device 308. An encryptor may encrypt one or more received clear content streams and output an encrypted stream for each received content stream. The terms "encrypted stream" and "encrypted content" may be used to refer to the encrypted representation of the content stream.

One method of encrypting data is through the use of control words (CWs) and entitlement control messages (ECMs). In accordance with the present invention, the edge device 308 may initiate an encryption session by sending a request for a CW and ECM or a set of CWs and ECMs over a network 310 to one or more ECM generators (ECMG) 312 prior to receiving a content stream. The ECMG 312 may comprise any computing device that incorporates the use of at least one processor and at least one memory for storing software or processor executable instructions. The ECMG 312 may comprise random access memory (RAM), non-volatile memory, and an input/output (I/O) module for communicating with other components or elements of the example network configuration 300. In some embodiments, the ECMG 312 may be part of the edge device 308.

The CW is viable for a length of time called a cryptoperiod. The length of a cryptoperiod is variable and is determined in any number of ways as understood by those skilled in the art. ECMs are also viable for a cryptoperiod, after which the ECMs will timeout and expire. Because the CWs and ECMs are only viable for a certain amount of time, multiple CWs and ECMs may be utilized for a single content stream. The ECMG may send a set of CWs and associated ECMs to be used for encryption of a single content stream for its entire duration or it may send CWs and ECMs periodically over time to the edge device for the content stream.

Because the edge device 308 requests the CW and ECM prior to the receipt of a content stream, the request is for a "virtual" ECM that is devoid of any content-specific information such as content ID, Consumer Device ID, stream ID, or other program specific information as may be known to those skilled in the art. Rather, instead of content-specific information, the request may include placeholder content information for the virtual ECM. In some embodiments, the placeholder content information may be a preset value(s). In other embodiments, the placeholder content information may be randomly generated. In response, the ECMG 312 generates a CW and associated virtual ECM. The edge device 308 may also request a virtual ECM with DRM information, for example, a particular copy control information (CCI) value. A CCI value indicates whether the consumer may copy the content. There are at least four possible choices for this value: copy freely, copy no more, copy once and copy never. In some embodiments, the DRM information may be preset. In other embodiments, then DRM information may be randomly selected.

The ECMG 312 may return the virtual ECM(s) to the edge device 308. The edge device 308 retrieves and stores the CW(s) and virtual ECM(s) until a clear content stream is received from the content server 304. If a clear content stream is received, the edge device 308 may assign the virtual ECM(s) to the content stream and begin to encrypt the content stream with the CW(s) associated with the virtual ECM(s). The edge device 308 replaces corresponding placeholder content information with content-specific information, including for example, the actual content, subscriber device and/or specific stream identification information. The edge device 308 then updates any checksum, such as a cyclic redundancy check (CRC) covering those replaced fields, in each virtual ECM being assigned to that content stream. The edge device 308 embeds the updated virtual ECM(s) into the encrypted content stream and then transmits the encrypted content stream over a network 314 to the CPE 316. The network 314 may comprise an IP network, HFC network, including QAM channels and/or DOCSIS channels, or any other type of network capable of transporting the encrypted content as discussed herein.

When a clear content stream is received at the edge device, the edge device 308 may also send the ECMG a request to generate the ECMs with content specific information such as content ID, stream ID, or other program specific information as may be known to those skilled in the art. In response, ECMG 312 generates and returns content-specific ECM(s) to the edge device 308. Upon receipt of the content-specific ECM(s) and associated CW(s), the edge device 308 encrypts the content stream with the CW(s) of associated content-specific ECM(s). The edge device 308 embeds the content-specific ECM(s) into the encrypted content stream and then transmits the encrypted content stream over the network 314 to the CPE 316.

In some embodiments, it may be desirable to maintain a minimum number of virtual encryption sessions in anticipation of receiving multiple content streams. The edge device 308 may request and store CWs and virtual ECMs of multiple virtual encryption sessions from ECMG 312 and may keep track of the quantity of stored session information. The edge device 308 may from time to time compare the quantity of virtual sessions to a threshold value. For example, if it is determined that the number of sessions falls below a minimum threshold value, the edge device 308 may request initiation of another virtual encryption session. The edge device 308 may make the comparison after a virtual session is assigned to an incoming content stream, after virtual ECM(s) associated with a virtual session time out and expire, or periodically over time.

In other embodiments, it may be desirable to maintain multiple virtual encryption sessions where there is at least one virtual encryption session corresponding to each type of CCI value. The CCI value may be a two bit value representing at least four possible choices—copy freely, copy no more, copy once and copy never. In some embodiments, the CCI value may be represented by more than two bits which may provide for more than four possible choices. If the edge device maintains at least one virtual encryption session for each CCI value, then if the edge device receives a clear content stream, it may assign a virtual encryption session with a CCI value that matches the CCI rights associated with the content stream. After assigning the virtual encryption session, the edge device may then request another virtual encryption session to replace the one just assigned.

For playback of the content, in some embodiments, the CPE 316 may send a request via the network 314 to retrieve content depending on network and other conditions. In other embodiments, the CPE 316 may send a request through a network that does not touch the edge device 308 (path not shown). In some embodiments, the networks 306, 310 and 314 may include the communication links 101 discussed above, the external network 109, the network 210, an in-home network, a provider's wireless, coaxial, fiber, or hybrid fiber/coaxial distribution system (e.g., a DOCSIS network), or any other desired network. The CPE 316 may comprise any computing device that incorporates the use of at least one processor and at least one memory for storing software or processor executable instructions. The CPE 316 may comprise random access memory (RAM), non-volatile memory, and an input/output (I/O) module for communicating with other components or elements of the example network configuration 300. In some embodiments, the CPE 316 may include a DASH client application or other HTTP streaming client application. In some embodiments, the CPE 320 may correspond to the gateway interface device 111, personal computers 114, laptop computers 115 or other devices as shown in FIG. 1.

Figure 4:
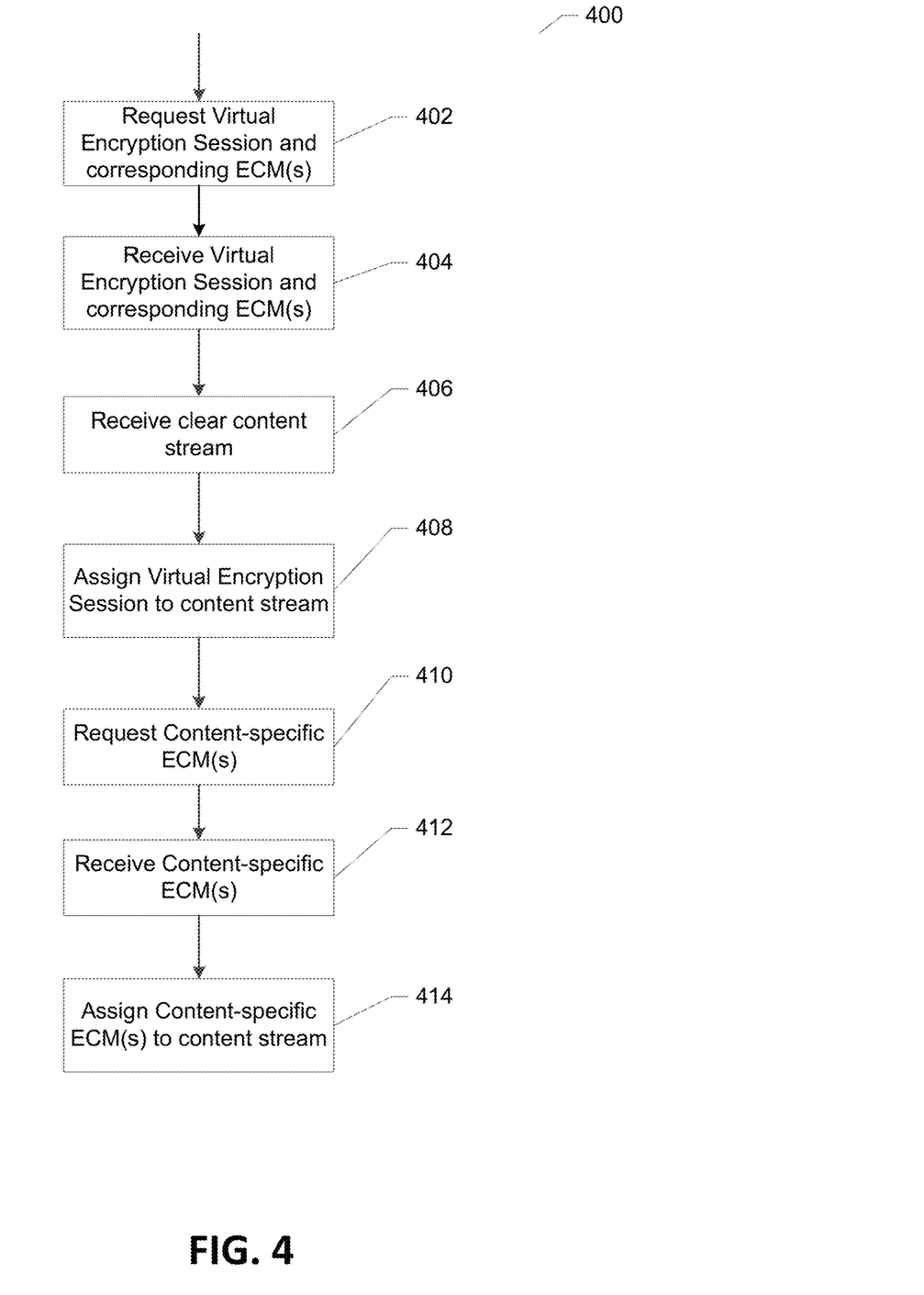
FIG. 4 shows an example flow chart illustrating methods performed in accordance with one or more aspects as described herein.
Figure 5:
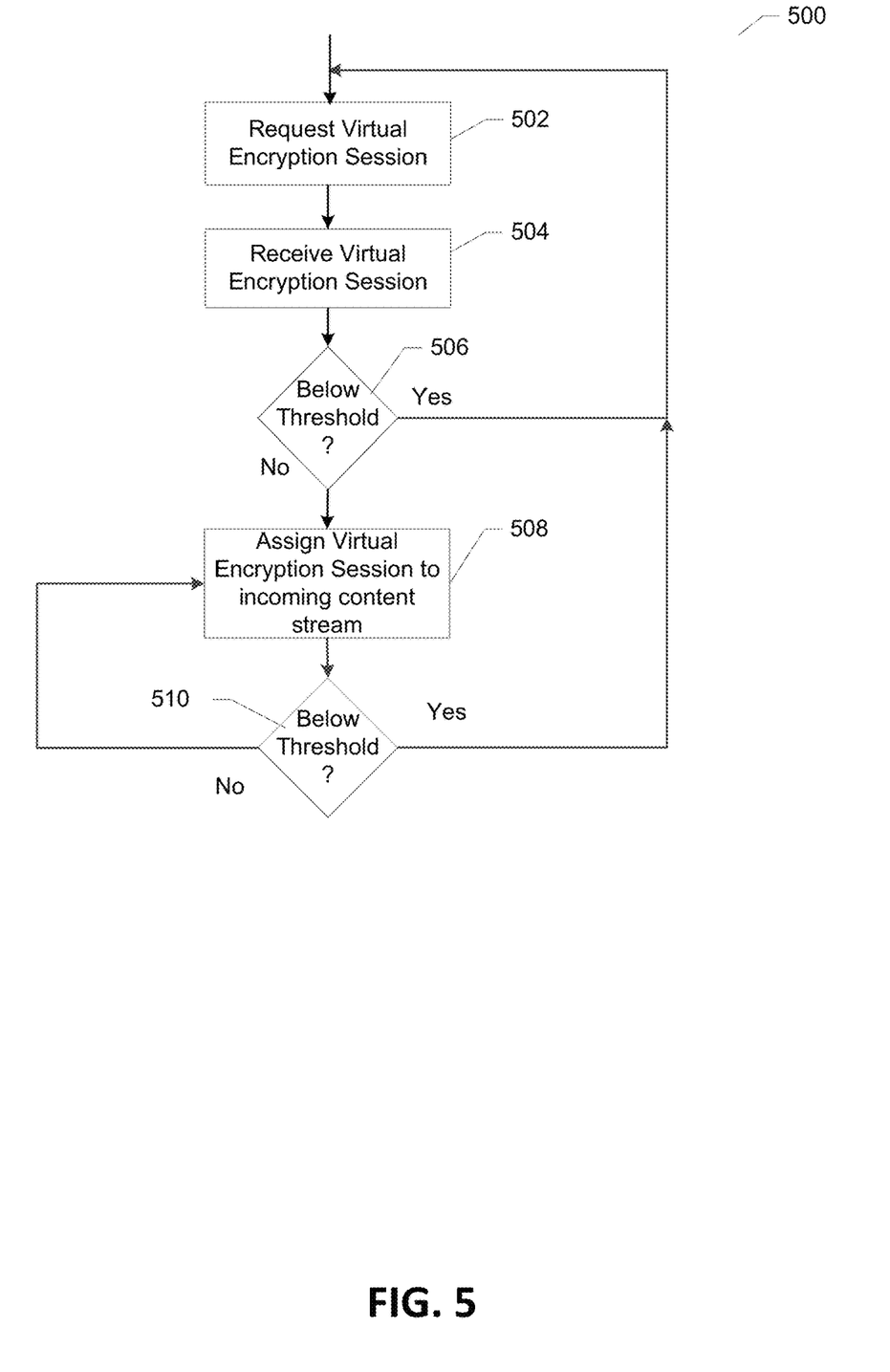
FIG. 5 shows an example flow chart illustrating methods performed in accordance with one or more aspects as described herein.

FIGS. 4 and 5 are exemplary flow diagrams illustrating example methods 400 and 500, respectively, in accordance with one or more disclosed features described herein. In one or more embodiments, the methods shown in FIGS. 4 and 5 and/or one or more steps thereof may be performed by one or more computing devices (e.g., the computing device 200, the edge device 308, and the like). In other embodiments, the methods shown in FIGS. 4 and 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

Referring to FIG. 4, at step 402, an edge device may initiate a virtual encryption session by sending a request for a CW(s) and corresponding ECM(s) that is/are not tied to a particular content stream or subscriber device. In accordance with one or more features of the present invention, the request may include DRM information and placeholder content information rather than content-specific information such as content ID, Consumer Device ID, stream ID or the like. As discussed above with respect to FIG. 3, the DRM and placeholder content information can be generated in a number of different ways as may be known to those skilled in the art. In some embodiments, the request may be sent to a separate ECMG such as ECMG 312. At step 404, the virtual encryption session and corresponding virtual ECM(s) using the DRM and placeholder content information are received and stored in anticipation of the receipt of a content stream. In some embodiments, any number of virtual encryption sessions and corresponding virtual ECMs can be requested and stored.

At step 406, clear content is received from the storage system. At step 408, after the clear content is received, a virtual encryption session and corresponding virtual ECM(s) are assigned to the clear content stream and encryption of the content begins using the CW(s) associated with the virtual ECM(s). The placeholder content information in each corresponding virtual ECM(s) may be replaced with actual content-specific information of the requested content stream. Additionally, a checksum may be updated to reflect the changes to the updated fields of the virtual ECM(s) that are assigned to that content stream.

At step 410, the edge device requests a new batch of ECM(s) with content-specific information that is based on the requested content stream. For example, the request for the ECM may include a specific CCI value, a stream ID, content ID, consumer device ID or other CPE specific information. At step 412, the new ECM(s) are received and at step 414, the new ECM(s) are assigned to the content stream, and encryption of the content continues with the new CW(s) associated with the new ECM(s). There may be unused virtual ECM(s) associated with a virtual encryption session when the new ECM(s) are received. In some embodiments, the unused virtual ECM(s) for that session may be discarded when the new ECM(s) are assigned. In other embodiments, the unused virtual ECM(s) for that session may continue to be used until depleted prior to the new ECM(s) being assigned to the content stream.

In some embodiments, it may be desirable to have a minimum number of virtual encryption sessions available. Referring now to FIG. 5, at step 502, a request is made for a virtual encryption session and corresponding virtual ECM(s) and at step 504, the virtual encryption session and corresponding virtual ECM(s) is received and stored in anticipation of the receipt of a content stream, which are also discussed in more detail above in FIG. 4. An edge device may store any number of virtual encryption sessions in anticipation of, for example, receiving multiple content streams. At step 506, the number of virtual encryption sessions stored is compared to a threshold value. If the threshold value is not satisfied, for example, if the number of available virtual encryption sessions falls below the threshold value, then the process may continue at 502 where another virtual encryption session is requested.

If it is determined that the number of available virtual encryption sessions meets the threshold value, then the process may continue until at step 508 where a virtual session is then assigned to an incoming clear content stream. At step 510, after the assignment of a virtual session, the number of available virtual encryption sessions may again be compared to the threshold value. If the number of available virtual encryption sessions fails to meet the threshold value, then the process may continue at 502 where another virtual ECM is requested. If it is determined in step 510 that the number of available virtual encryption sessions meets the threshold value, then the process continues at step 508. In some embodiments it may be desirable to compare the number of encryption sessions to the threshold value more frequently due to the ECMs of some encryption sessions timing out and expiring. The comparison could be made at a predetermined time, periodically over time, randomly or any other way known to those skilled in the art.

The above steps may be simultaneously taking place for any number of streams.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   sending, by a computing device, to an edge device, and before the edge device receives content, a first entitlement control message comprising a first cryptographic key and placeholder content information;
   receiving, by the computing device, from the edge device, and after the edge device receives the content, a request for a second entitlement control message, wherein the request comprises content-specific information associated with the content; and
   sending, by the computing device and to the edge device, the second entitlement control message, wherein the second entitlement control message comprises a second cryptographic key and the content-specific information.

2. The method of claim 1, wherein the content-specific information is associated with a particular content, and wherein the first entitlement control message does not identify the particular content.

3. The method of claim 1, wherein at least one of the first cryptographic key and the second cryptographic key comprises a control word for encrypting a content stream.

4. The method of claim 1, wherein the placeholder content information comprises a randomly generated value.

5. The method of claim 1, wherein the first entitlement control message and the first cryptographic key are valid for a time period after the sending the first entitlement control message.

6. The method of claim 1, wherein at least one of the first entitlement control message or the second entitlement control message further comprises digital rights management information.

7. The method of claim 6, wherein the digital rights management information comprises copy control information that indicates at least one of copy freely, copy no more, copy once, or copy never.

8. The method of claim 1, wherein the content-specific information comprises at least one of a content identifier associated with content, a consumer device identifier associated with the content, a stream identifier associated with the content, or digital rights management information associated with the content.

9. The method of claim 1, further comprising receiving, from the edge device, a request for a virtual entitlement control message, wherein the sending the first entitlement control message is performed based on the request for the virtual entitlement control message.

10. A computing device comprising:
    one or more processors;
    memory storing instructions that, when executed by the one or more processors, cause the computing device to:
      send, to an edge device and before the edge device receives content, a first entitlement control message comprising a first cryptographic key and placeholder content information;
      receive, from the edge device and after the edge device receives the content, a request for a second entitlement control message, wherein the request comprises content-specific information associated with the content; and
      send, to the edge device, the second entitlement control message, wherein the second entitlement control message comprises a second cryptographic key and the content-specific information.

11. The computing device of claim 10, wherein the content-specific information is associated with a particular content, and wherein the first entitlement control message does not identify the particular content.

12. The computing device of claim 10, at least one of the first cryptographic key and the second cryptographic key comprises a control word for encrypting a content stream.

13. The computing device of claim 10, wherein the placeholder content information comprises a randomly generated value.

14. The computing device of claim 10, wherein at least one of the first entitlement control message or the second entitlement control message further comprises digital rights management information.

15. The computing device of claim 10, wherein the content-specific information comprises at least one of a content identifier associated with content, a consumer device identifier associated with the content, a stream identifier associated with the content, or digital rights management information associated with the content.

16. The computing device of claim 10, wherein the instructions, when executed by the one or more processors, further cause the computing device to receive, from the edge device, a request for a virtual entitlement control message, and wherein the instructions, when executed by the one or more processors, cause the computing device to send the first entitlement control message based on the request for the virtual entitlement control message.

17. A non-transitory computer-readable medium storing instructions that, when executed, cause:

sending, to an edge device and before the edge device receives content, a first entitlement control message comprising a first cryptographic key and placeholder content information;

receiving, from the edge device and after the edge device receives the content, a request for a second entitlement control message, wherein the request comprises content-specific information associated with the content; and sending, to the edge device, the second entitlement control message, wherein the second entitlement control message comprises a second cryptographic key and the content-specific information.

18. The non-transitory computer-readable medium of claim 17, wherein the content-specific information is associated with a particular content, and wherein the first entitlement control message does not identify the particular content.

19. The non-transitory computer-readable medium of claim 17, wherein the placeholder content information comprises a randomly generated value.

20. The non-transitory computer-readable medium of claim 17, wherein the content-specific information comprises at least one of a content identifier associated with content, a consumer device identifier associated with the content, a stream identifier associated with the content, or digital rights management information associated with the content.

* * * * *

UNITED STATES PATENT AND TRADEMARK OFFICE
CERTIFICATE OF CORRECTION

| | |
|---|---|
| PATENT NO. | : 11,108,743 B2 |
| APPLICATION NO. | : 16/446095 |
| DATED | : August 31, 2021 |
| INVENTOR(S) | : Penugonda et al. |

It is certified that error appears in the above-identified patent and that said Letters Patent is hereby corrected as shown below:

On the Title Page

Item (71) Applicant, Line 2:
After "LLC", insert --, Philadelphia, PA (US)--

In the Specification

Column 8, Detailed Description, Line 25:
Delete "320" and insert --316-- therefor Signed and Sealed this
Ninth Day of May, 2023

Katherine Kelly Vidal
*Director of the United States Patent and Trademark Office*